(12) United States Patent
Duan

(10) Patent No.: US 10,097,803 B2
(45) Date of Patent: Oct. 9, 2018

(54) DISPLAY PROCESSING APPARATUS, DEVICE AND METHOD

(71) Applicant: BOE TECHNOLOGY GROUP CO., LTD., Beijing (CN)

(72) Inventor: Ran Duan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/534,432

(22) PCT Filed: Dec. 26, 2016

(86) PCT No.: PCT/CN2016/112074
§ 371 (c)(1),
(2) Date: Jun. 8, 2017

(87) PCT Pub. No.: WO2017/128908
PCT Pub. Date: Aug. 3, 2017

(65) Prior Publication Data
US 2018/0063498 A1 Mar. 1, 2018

(30) Foreign Application Priority Data
Jan. 29, 2016 (CN) .......................... 2016 1 0064465

(51) Int. Cl.
*H04N 9/64* (2006.01)
*H04N 9/31* (2006.01)
(Continued)

(52) U.S. Cl.
CPC ............... *H04N 9/646* (2013.01); *G09G 3/36* (2013.01); *H04N 5/445* (2013.01);
(Continued)

(58) Field of Classification Search
CPC ............. H04N 21/435; H04N 21/4622; H04N 21/47205; H04N 21/6547; H04N 5/445;
(Continued)

(56) References Cited

U.S. PATENT DOCUMENTS

2009/0235320 A1 9/2009 Lee et al.
2015/0002739 A1 1/2015 Rui
(Continued)

FOREIGN PATENT DOCUMENTS

CN 101493848 A 7/2009
CN 101764982 A 6/2010
(Continued)

OTHER PUBLICATIONS

The World Intellectual Property Organization (WIPO) International Search Report and Written Opinion for PCT/CN2016/112074 dated Mar. 22, 2017; 13 pages.
(Continued)

*Primary Examiner* — John Schnurr
(74) *Attorney, Agent, or Firm* — Anova Law Group, PLLC

(57) ABSTRACT

A display processing apparatus includes a primary processing chip configured to receive a first ultra-high-definition video image and generate sub-branch primary image signals, and secondary processing chips coupled to the primary processing chip and to each other. Each of the secondary processing chips is configured to receive and process one of the sub-branch primary image signals to generate a first output image signal, receive and process an image section signal obtained from a second ultra-high-definition video image to generate a second output image signal.

18 Claims, 13 Drawing Sheets

(51) Int. Cl.
  *H04N 5/445* (2011.01)
  *G09G 3/36* (2006.01)
  *H04N 21/462* (2011.01)
  *H04N 21/472* (2011.01)
  *H04N 21/6547* (2011.01)
  *H04N 21/435* (2011.01)
(52) U.S. Cl.
  CPC ......... *H04N 9/3179* (2013.01); *H04N 21/435* (2013.01); *H04N 21/4622* (2013.01); *H04N 21/47205* (2013.01); *H04N 21/6547* (2013.01)
(58) Field of Classification Search
  CPC ...... H04N 5/268; H04N 9/646; H04N 9/3179; G09G 3/36
  See application file for complete search history.

(56) References Cited

U.S. PATENT DOCUMENTS

| | | | |
|---|---|---|---|
| 2015/0172559 A1 | 6/2015 | Krug | |
| 2015/0326923 A1* | 11/2015 | Chung | H04N 21/2362 725/110 |
| 2015/0350619 A1 | 12/2015 | Nakai | |
| 2016/0021326 A1 | 1/2016 | Ma et al. | |
| 2017/0208334 A1* | 7/2017 | Yoo | H04N 19/136 |

FOREIGN PATENT DOCUMENTS

| | | |
|---|---|---|
| CN | 102708840 A | 10/2012 |
| CN | 202677808 U | 1/2013 |
| CN | 202887164 U | 4/2013 |
| CN | 103347163 A | 10/2013 |
| CN | 103702060 A | 4/2014 |
| CN | 104104888 A | 10/2014 |
| CN | 105141876 A | 12/2015 |
| CN | 105704407 A | 6/2016 |
| CN | 205647750 U | 10/2016 |

OTHER PUBLICATIONS

The State Intellectual Property Office of the People's Republic of China (SIPO) Office Action 1 for 201610064465.2 dated Jun. 2, 2017.

* cited by examiner

DISPLAY PROCESSING APPARATUS, DEVICE AND METHOD

CROSS-REFERENCE TO RELATED APPLICATION

This application is a national phase entry under 35 U.S.C. § 371 of International Application No. PCT/CN2016/112074, filed on Dec. 26, 2016, which claims priority to Chinese Patent Application No. 201610064465.2, filed on Jan. 29, 2016, the entire contents of both of which are incorporated herein by reference.

TECHNICAL FIELD

The disclosure generally relates to display technologies and, more particularly, to a display processing apparatus, a related display processing device, and a related display processing method.

BACKGROUND

With the development of ultra-high-definition display systems, the resolution of liquid crystal panels becomes higher and higher. Thus, the demand for signal processing capability of the display processing systems also becomes more sophisticated.

For latest ultra-high-definition screens having a resolution of 8K4K@60 Hz or above, in order to properly display an ultra-high-definition video, the display processing systems include Field-Programmable Gate Array (FPGA) chips that can process a large amount of data. However, such FPGA chips usually are relatively expensive, so that the ultra-high-definition display processing systems also have high production costs.

Accordingly, it is desirable to provide a display processing apparatus, a related display processing device, and a related display processing method to at least partially alleviate one or more problems set forth above and to solve other problems in the art.

BRIEF SUMMARY

In accordance with some embodiments of the disclosure, a display processing apparatus, a related display processing device, and a related display processing method are provided.

In one aspect, the present disclosure provides a display processing apparatus including a primary processing chip configured to receive a first ultra-high-definition video image and generate two or more sub-branch primary image signals, and two or more secondary processing chips coupled to the primary processing chip and coupled to each other. Each of the secondary processing chips is receive and process one of the sub-branch primary image signals to generate a first output image signal, configured to receive and process an image section signal obtained from a second ultra-high-definition video image to generate a second output image signal.

In some embodiments, the first ultra-high-definition video image has a lower resolution than the second ultra-high-definition video image. The sub-branch primary image signals correspond to first regions of the first ultra-high-definition video image.

Each boundary between neighboring first regions is along a same direction in the first ultra-high-definition video image. The image section signals correspond to second regions of the second ultra-high-definition video image. Each boundary between neighboring second regions is along a same direction in the second ultra-high-definition video image.

In some embodiments, the first ultra-high-definition video image includes a 4K2K@60 Hz video image signal, the second ultra-high-definition video image includes an 8K4K@60 Hz video image signal, and each of the primary processing chip and the secondary processing chips includes a field-programmable gate array chip.

In some embodiments, the display processing apparatus further includes a primary video processing unit coupled to the primary processing chip and configured to receive the first ultra-high-definition video image and convert the first ultra-high-definition video image into two branch primary image signals. The primary processing chip is further configured to receive the branch primary image signals transmitted from the primary video processing unit, and divide the branch primary image signals into the sub-branch primary image signals.

In some embodiments, the primary video processing unit includes a decoder and two converters. The decoder is configured to receive the first ultra-high-definition video image and decode the first ultra-high-definition video image into two channel signals. The two converters are configured to receive the two channel signals, respectively, and convert the two channel signals into two low-voltage differential signals as the two branch primary image signals, respectively.

In some embodiments, the primary processing chip includes a resolution adjuster configured to adjust resolutions of the received two branch primary image signals to generate two resolution-adjusted branch primary image signal, an on-screen display fuser configured to fuse screen display adjusting information and the two resolution-adjusted branch primary image signals, a system on chip (SOC) signal processor configured to receive and convert an SOC signal, a selector configured to select the fused signals or the converted SOC signal as the sub-branch primary image signals, a transmitter configured to transmit the sub-branch primary image signals to the secondary processing chips, a luminance adjuster configured to generate luminance adjustment signals based on luminance adjustment information sent from the secondary processing chips, and a synchronization processor configured to control synchronization of the secondary processing chips.

In some embodiments, the display processing apparatus further includes two or more secondary video processing units each configured to receive a regional image obtained from the second ultra-high-definition video image, and convert the regional image into one or more branch regional image signals. The regional image includes a fraction of the second ultra-high-definition video image. Each of the secondary processing chips is further configured to receive one of the one or more branch regional image signals transmitted from each of at least one secondary video processing units coupled to the secondary processing chip. The received one or more branch regional image signals form the image section signal.

In some embodiments, each of the secondary processing chips is further configured to receive image edge information transmitted from a coupled secondary processing chip, and generate the output image signal based on a combination of the received image edge information and the received one or more branch regional image signals.

In some embodiments, each of the secondary processing chips includes a resolution adjuster configured to adjust resolutions of the received one or more branch regional image signals to generate one or more resolution-adjusted branch regional image signals, a synchronization signal receiver configured to receive a synchronization reference image signal from the primary processing chip, an image edge information processor configured to receive the image edge information transmitted from the coupled secondary processing chip and send self-generated image edge information to the coupled secondary processing chip, and an image processor configured to use the synchronization reference image signal and the received image edge information to perform an image enhancement processing on the two resolution-adjusted branch regional image signals to generate two enhanced branch regional image signals.

In some embodiments, the resolution adjuster is a first resolution adjuster. Each of the secondary processing chips further includes a second resolution adjuster configured to adjust resolutions of the two enhanced branch regional image signals and a backlight information processor configured to send luminance adjustment information to the primary processing chip. The luminance adjustment information is determined based on an output of the second resolution adjuster.

In some embodiments, each of the secondary video processing units includes a decoder configured to receive the second ultra-high-definition video image and decode the second ultra-high-definition video image into a first channel signal and a second channel signal, a first converter configured to receive and convert the first channel signal into a first low-voltage differential signal and send the first low-voltage differential signal to one of the secondary processing chips coupled to the secondary video input unit as one branch regional image signal, and a second converter configured to receive and convert the second channel signal into a second low-voltage differential signal and send the second low-voltage differential signal to another one of the secondary processing chips coupled to the secondary video input unit as another branch regional image signal.

In some embodiments, the display processing apparatus further includes three or more storage units each corresponding to one of the primary processing chip and the secondary processing chips and configured to store video image signals.

In another aspect, the present disclosure provides a display processing apparatus including a primary processing chip and a primary video processing unit coupled to the primary processing chip. The display processing apparatus further includes a first secondary processing chip, a second secondary processing chip, a third secondary processing chip, and a fourth secondary processing chip respectively coupled to the primary processing chip. The display processing apparatus also includes a first secondary video processing unit, a second secondary video processing unit, a third secondary video processing unit, and a fourth secondary video processing unit. The first secondary video processing unit and the second secondary video processing unit are coupled to the first secondary processing chip and the third secondary processing chip. The third video processing unit and the fourth video processing unit are coupled to the second secondary processing chip and the fourth secondary processing chip. The primary video processing unit is configured to receive a first ultra-high-definition video image and convert the first ultra-high-definition video image into two branch primary image signal. Each of the secondary video processing units is configured to receive a regional image obtained from a second ultra-high-definition video image and convert the regional image into two branch regional image signals. The primary processing chip is configured to receive the two branch primary image signals from the primary video processing unit, divide the two branch primary image signals into sub-branch primary image signals, and send the sub-branch primary image signals to the secondary processing chips. Each of the secondary processing chips is configured to receive and process one of the sub-branch primary image signals to generate a first output image signal, receive one branch regional image signal from each of two corresponding secondary video processing units and process the received branch regional image signals to obtain a second output image. The regional image is an image corresponding to ¼ region of the second ultra-high-definition video image.

In another aspect, the present disclosure provides a display processing method including receiving, by each of a plurality of processing chips, an image section signal obtained from an ultra-high-definition video image, and processing, by the each of the processing chips, the image section signal to generate an output image signal. The image section signals correspond to regions of the second ultra-high-definition video image and each two neighboring regions share a vertical boundary.

In some embodiments, the ultra-high-definition video image includes an 8K4K@60 Hz video image signal, and each of the processing chips includes a field-programmable gate array chip.

In some embodiments, the display processing method further includes receiving, by the each of the processing chips, image edge information transmitted from a coupled processing chip, and generating, by the each of the processing chips, the corresponding output image signal based on a combination of the received image edge information and the image section signal.

In some embodiments, the display processing method further includes receiving, by each of at least two video processing units, a regional image obtained from the ultra-high-definition video image, and converting, by the each of the video processing units, the regional image into two branch regional image signals, Receiving, by the each of the processing chips, the image section signal includes receiving, by the each of the processing chips, two branch regional image signals transmitted from two of the video processing units coupled to the processing chip.

In some embodiments, the display processing method further includes adjusting, by a first resolution adjuster of the processing chip, resolutions of the received two branch regional image signals to generate two resolution-adjusted branch regional image signals, receiving, by a synchronization signal receiver of the processing chip, a synchronization reference image signal, receiving, by an image edge information processor of the processing chip, the image edge information transmitted from a coupled processing chip, sending, by the image edge information processor of the processing chip, self-generated image edge information to the coupled processing chip, performing, by an image processor of the processing chip, an image enhancement processing on the two resolution-adjusted branch regional image signals using the synchronization reference image signal and the received image edge information to generate two enhanced branch regional image signals, adjusting, by a second resolution adjuster of the processing chip, resolutions of the two enhanced branch regional image signals, and outputting, by a backlight information processor of the processing chip, luminance adjustment information. The luminance adjustment information is determined based on an output of the second resolution adjuster.

In some embodiments, the display processing method further includes receiving, by a decoder of the each of the video processing units, the ultra-high-definition video image, decoding, by the decoder, the ultra-high-definition video image into a first channel signal and a second channel signal, receiving, by a first converter of the video processing unit, the first channel signal, converting, by the first converter, the first channel signal into a first low-voltage differential signal, sending, by the first converter, the first low-voltage differential signal to one of the processing chips coupled to the video processing unit as one branch regional image signal, receiving, by a second converter of the video processing unit, the second channel signal, converting, by the second converter, the second channel signal into a second low-voltage differential signal, and sending, by the second converter, the second low-voltage differential signal to another one of the processing chips coupled to the video processing unit as another branch regional image signal.

In another aspect, the present disclosure provides a display processing method including receiving, by a primary processing chip, an ultra-high-definition video image, generating, by the primary processing chip, two or more sub-branch primary image signals based on the ultra-high-definition video image, transmitting, by the primary processing chip, the two or more sub-branch primary image signals to two or more secondary processing chips, and processing, by each of the secondary processing chips, the received sub-branch primary image signal to generate an output image signal.

In some embodiments, the ultra-high-definition video image includes a 4K2K@60 Hz video image signal. Each of the primary processing chip and the secondary processing chips includes a field-programmable gate array chip.

In some embodiments, the display processing method further includes receiving, by a video processing unit, the ultra-high-definition video image, and converting, by the video processing unit, the ultra-high-definition video image into two branch primary image signals. Receiving, by the primary processing chip, the ultra-high-definition video image includes receiving, by the primary processing chip, the branch primary image signals from the video processing unit. Generating, by the primary processing chip, the sub-branch primary image signals includes dividing the branch primary image signals into the sub-branch primary image signals.

In some embodiments, the display processing method further includes adjusting, by a resolution adjuster of the primary processing chip, resolutions of the received two branch primary image signals to generate two resolution-adjusted branch primary image signals, fusing, by an on-screen display fuser of the primary processing chip, screen display adjusting information and the two resolution-adjusted branch primary image signals, receiving and converting, by a system on chip (SOC) signal processor of the primary processing chip, an SOC signal, selecting, by a selector of the primary processing chip, the fused signals or the converted SOC signal as the sub-branch primary image signals, transmitting, by a transmitter of the primary processing chip, the sub-branch primary image signals to the secondary processing chips, generating, by a luminance adjuster of the primary processing chip, luminance adjustment signals based on luminance adjustment information sent from the secondary processing chips, and controlling, by a synchronization processor of the primary processing chip, synchronization of the secondary processing chips.

In some embodiments, the display processing method further includes receiving, by a decoder of the primary video processing unit, the ultra-high-definition video image, decoding, by the decoder, the ultra-high-definition video image into two channel signals, receiving, by two converter of the primary video processing unit, the two channel signals, respectively, and converting, by the two converters, the two channel signals into two low-voltage differential signals as the two branch primary image signals, respectively.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosure can be more fully appreciated with reference to the following detailed description of embodiments when considered in connection with the drawings, in which like reference numerals identify like elements unless otherwise specified. It should be noted that the drawings are merely examples for illustrative purposes according to various disclosed embodiments and are not intended to limit the scope of the present disclosure.

DETAILED DESCRIPTION

Figure 1:
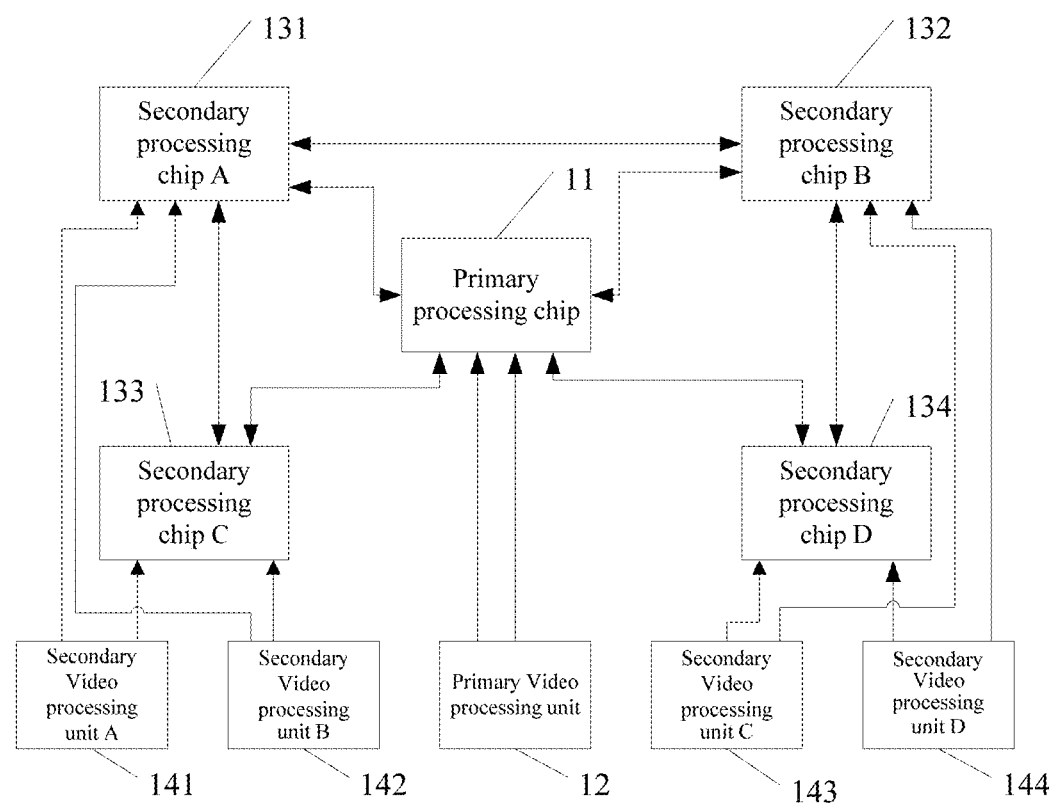
FIG. 1 is a schematic diagram of an exemplary display processing apparatus in accordance with some embodiments of the present disclosure.

For those skilled in the art to better understand the technical solution of the disclosure, reference will now be made in detail to exemplary embodiments of the disclosure, which are illustrated in the accompanying drawings. Wherever possible, the same reference numbers will be used throughout the disclosure to refer to the same or like parts.

In accordance with various embodiments, the disclosure provides a display processing apparatus, a related display processing device, and a related display processing method.

In some embodiments, the disclosed display processing apparatus can comprise a primary processing chip, a primary video processing unit coupled to the primary processing chip, four secondary processing chips that are coupled to the primary processing chip and are coupled to each other, and four secondary video processing units.

The primary video processing unit is configured to receive a first ultra-high-definition video image, and convert the first ultra-high-definition video image into two branch signals, also referred to as "branch primary image signals." Each of the secondary video processing units is configured to receive one of regional images obtained from a second ultra-high-definition video image, and convert the corresponding regional image into two branch signals, also referred to as "branch regional image signals."

The first ultra-high-definition video image can include, e.g., a 4K2K@60 Hz video image signal. The second ultra-high-definition video image can include, e.g., an 8K4K@60 Hz video image signal. Each regional image corresponds to a one-fourth region of a video image corresponding to the second ultra-high-definition video image.

The primary processing chip and the secondary processing chips can be, e.g., field-programmable gate array (FPGA) chips. The primary processing chip is configured to receive the branch primary image signals transmitted from the primary video processing unit, generate sub-branch primary image signals based on the branch primary image signals, and transmit the sub-branch primary image signals to the secondary processing chips. The primary processing chip is also configured to generate a synchronization reference image signal and transmit the synchronization reference image signal to each of the secondary processing chips.

Each of the secondary processing chips is configured to receive one branch regional image signal transmitted from each of two secondary video processing units coupled to that secondary processing chip, receive the synchronization reference image signal transmitted from the primary processing chip, and process the received two branch regional image signals based on the synchronization reference image signal to generate an output image signal.

Each secondary processing chip is further configured to receive image edge information transmitted from a coupled secondary processing chip, i.e., another secondary processing chip coupled to that secondary processing chip, and generate the corresponding output image signal based on a combination of the received image edge information, the synchronization reference image signal, and the received two branch regional image signals.

In some embodiments, each secondary processing chip can comprise a first resolution adjustment module (also referred to as a "first resolution adjuster"), a synchronization signal receiving module (also referred to as a "synchronization signal receiver"), an image edge information processing module (also referred to as an "image edge information processor"), an image processing module (also referred to as an "image processor"), a second resolution adjustment module (also referred to as a "second resolution adjuster"), and a backlight information processing module (also referred to as a "backlight information processor"). The first resolution adjustment module is configured to adjust resolutions of the received two branch regional image signals. The synchronization signal receiving module is configured to receive the synchronization reference image signal from the primary processing chip. The image edge information processing module is configured to receive image edge information transmitted from a coupled secondary processing chip, and send self-generated image edge information to a coupled secondary processing chip, which can be the same as or different from the coupled secondary processing chip sending the image edge information to the secondary processing chip. The image processing module is configured to combine the synchronization reference image signal and the received image edge information, and perform an image enhancement process on the two resolution-adjusted branch regional image signals. The second resolution adjustment module is configured to adjust resolutions of the two enhanced branch regional image signals. The backlight information processing module is configured to send luminance adjustment information, which is determined based on an output of the second resolution adjustment module, to the primary processing chip.

Each of the secondary processing chip is also configured to receive one of the sub-branch primary image signals from the primary processing chip, process the received sub-branch primary image signal to generate the output image signal.

In some embodiments, the primary processing chip can comprise a resolution adjustment module (also referred to as a "resolution adjuster"), an on-screen display (OSD) module (also referred to as an "on-screen display fuser"), a system on chip (SOC) signal processing module (also referred to as a "system on chip signal processor"), a selection module (also referred to as a "selector"), a communication module (also referred to as a "transmitter"), a luminance adjustment module (also referred to as a "luminance adjuster"), and a synchronization processing module (also referred to as a "synchronization processor"). The resolution adjustment module is configured to adjust resolutions of the received two branch primary image signals. The OSD module is configured to fuse screen display adjusting information and the two resolution-adjusted branch primary image signals. The SOC signal processing module is configured to receive and convert an SOC signal. The selection module is configured to select the sub-branch primary image signal based on the fused signals and the converted SOC signal. The communication module is configured to transmit the sub-branch primary image signals and the synchronization reference image signal to the secondary processing chips. The luminance adjustment module is configured to generate the luminance adjustment signals based on luminance adjustment information sent from the secondary processing chips. The synchronization processing module is configured to control synchronization of the secondary processing chips.

In some embodiments, the primary video processing unit can comprise a decoding module (also referred to as a "decoder") configured to receive the first ultra-high-definition video image and decode the first ultra-high-definition video image into two channel signals, and two converting modules (also referred to as "converters") configured to receive the two channel signals, respectively, and convert the two channel signals into two low-voltage differential signals (LVDS's) as the two branch primary image signals, respectively.

In some embodiments, each secondary video processing unit can comprise a decoding module (also referred to as a "decoder"), a first converting module (also referred to as a "first converter"), and a second converting module (also referred to as a "second converter"). The decoding module is configured to receive the corresponding regional image of the second ultra-high-definition video image and decode the received regional image into a first channel signal and a second channel signal. The first converting module is configured to receive the first channel signal, convert the first channel signal into a first low-voltage differential signal, and send the first low-voltage differential signal to a coupled secondary processing chip as a branch regional image signal. The second converting module is configured to receive the second channel signal, convert the second channel signal into a second low-voltage differential signal, and send the second low-voltage differential signal to another coupled secondary processing chip as another branch regional image signal.

Referring to FIG. 1, a schematic diagram of an exemplary display processing apparatus is shown in accordance with some embodiments of the disclosure.

As illustrated, the disclosed display processing apparatus can include a primary processing chip 11, a primary video processing unit 12, four secondary processing chips 131-134, and four secondary video processing units 141-144.

The primary processing chip 11 is coupled to the primary video processing unit 12, the secondary processing chip A 131, the secondary processing chip B 132, secondary processing chip C 133, and the secondary processing chip D 134, respectively.

Each of the secondary processing chip A 131 and the secondary processing chip C 133 is coupled to both the secondary video processing unit A 141 and the secondary video processing unit B 142, Each of the secondary processing chip B 132 and the secondary processing chip D 134 is coupled to both the secondary video processing unit C 143 and the secondary video processing unit D 144.

The four secondary processing chips 131-134 are coupled to each other. That is, the secondary processing chip A 131 is coupled to the secondary processing chip B 132 and the secondary processing chip C 133, and the secondary processing chip B 132 is further coupled to the secondary processing chip D 134.

A display processing apparatus consistent with the disclosure, such as the exemplary display processing apparatus shown in FIG. 1, can be used to process video images of different resolutions, such as a first ultra-high-definition video image and a second ultra-high-definition video image where the first ultra-high-definition video image has a lower resolution than the second ultra-high-definition video image, as described below.

The primary video processing unit 12 is configured to receive the first ultra-high-definition video image, and convert the first ultra-high-definition video image into two branch primary image signals each corresponding to one half of the first ultra-high-definition video image. In some embodiments, the two branch primary image signals correspond to the left half and the right half of the first ultra-high-definition video image, respectively.

The primary processing chip 11 is configured to receive the two branch primary image signals transmitted from the primary video processing unit 12, further divide the two branch primary image signals into four sub-branch primary image signals, and transmit the four sub-branch primary image signals to the secondary processing chips 131-134, respectively. The primary processing chip 11 is also configured to generate a synchronization reference image signal and transmit the synchronization reference image signal to each of the secondary processing chips 131-134 to control the process synchronization of the secondary processing chips 131-134.

Each of the secondary video processing units 141-144 is configured to receive one of regional images Obtained from the second ultra-high-definition video image. In some embodiments, each regional image corresponds to a one-fourth region of the video image corresponding to the second ultra-high-definition video image. In some embodiments, the second ultra-high-definition video image is first divided according to a crossing segmentation mode before it is input into the secondary video processing units 141-144, i.e., the second ultra-high definition video is divided into four regional images corresponding to an upper left region, an upper right region, a lower left region, and a lower right region of the second ultra-high definition video, respectively, Each of the secondary video processing units 141-144 converts the received regional image into two branch regional image signals each corresponding to one half of the received regional image and transmits the branch regional image signals to corresponding secondary processing chips. In some embodiments, the two branch regional image signals obtained from a regional image correspond to the left half and the right half of the regional image, respectively.

The secondary processing chips 131-134 are configured to process received image section signals to generate an output image signal. Each of the image section signals corresponds to a section of the first ultra-high-definition video image or a section of the second ultra-high-definition video image, depending on what ultra-high-definition video image the display processing apparatus receives. When the display processing apparatus receives the first ultra-high-definition video image, the secondary processing chips 131-134 receive the four sub-branch primary image signals as the image section signals and the synchronization reference image signal transmitted from the primary processing chip 11, and process the received sub-branch primary image signals.

When the display processing apparatus receives the second ultra-high-definition video image, the secondary video processing units 141-144 process and divide the regional images into branch regional image signals as described above. Each of the secondary processing chips 131-134 receives a branch regional image signal from each of two corresponding secondary video processing units, receive the synchronization reference image signal transmitted from the primary processing chip 11, and process the received branch regional image signals based on the synchronization reference image signal to generate an output image signal. In this scenario, the two branch regional image signals received by the same secondary processing chip form the image section signal to be processed by the secondary processing chip. Specifically, the secondary processing chip A 131 receives one of the two branch regional image signals transmitted from the secondary video processing unit A 141 and one of the two branch regional image signals transmitted from the secondary video processing unit B 142, and the secondary processing chip C 133 receives the other one of the two branch regional image signal transmitted from the secondary video processing unit A 141 and the other one of the two branch regional image signals transmitted from the secondary video processing unit B 142. Similarly, the secondary processing chip B 132 receives one of the two branch regional image signals transmitted from the secondary video processing unit C 143 and one of the two branch regional image signals transmitted from the secondary video processing unit D 144, and the secondary processing chip D 134 receives the other one of the two branch regional image signals transmitted from the secondary video processing unit C 143 and the other one of the two branch regional image signals transmitted from the secondary video processing unit D 144.

In some embodiments, the first ultra-high-definition video image can include a 4K2K@60 Hz (3840×2160) video image signal, and the second ultra-high-definition video image can include an 8K4K@60 Hz (7680×4320) video image signal.

Since each of the four secondary processing chips only needs to process an image section signal corresponding to one fourth of the second ultra-high-definition video, the secondary processing chips can be selected from processing chips that have a middle to low data processing capability and also have a relatively low price. Therefore, a display processing apparatus according to the present disclosure can realize ultra-high-definition video image processing without requiring high data processing capability chips, thus has reduced production costs compared to existing display processing apparatuses.

Figure 2:
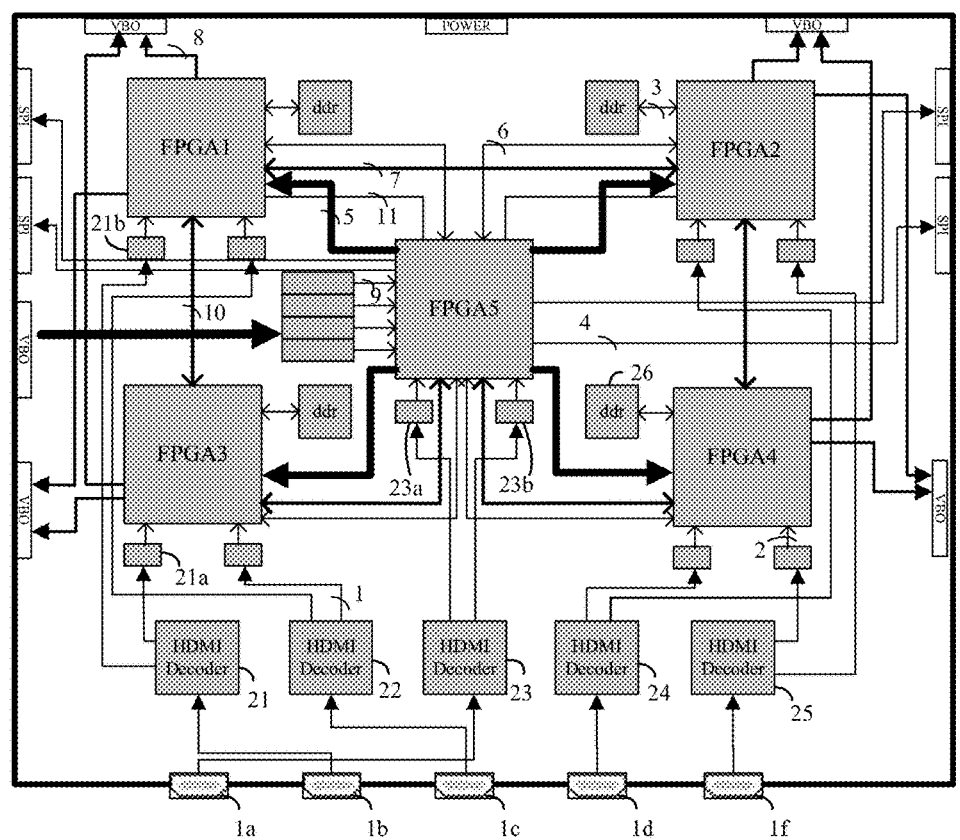
FIG. 2 is a schematic diagram of an exemplary display processing apparatus in accordance with some other embodiments of the present disclosure.

Referring to FIG. 2, a schematic diagram of an exemplary display processing apparatus is shown in accordance with some embodiments to demonstrate the detailed structure and working principle of the disclosed display processing apparatus.

As illustrated, the display processing apparatus can include five field-programmable gate array (FPGA) chips. FPGA5 can be the primary processing chip, and FPGA1-4 can be the secondary processing chips. In some embodiments, the FPGA chips can be selected from the processing chips that have a middle to low data processing capability.

Five High-Definition Multimedia Interfaces (HDMI) 1*a*-1*f* are disposed for receiving the ultra-high-definition video images. In some embodiments, HDMI interface 1*a* is configured to receive a 4K2K@60 Hz (3840×2160) signal, i.e., the first ultra-high-definition video image (also referred to as a "first video image"), from a first video supply terminal, e.g., a video player. An 8K4K@60 Hz (7680× 4320) image signal, i.e., the second ultra-high-definition video image (also referred to as a "second video image"), input from a second video supply terminal, e.g., a video player, can be divided into four regions, i.e., the four regional images (3840×2160×4). Each of the four HDMI interfaces 1*b*, 1*c*, 1*d*, and 1*f* can receive one region image signal corresponding to ¼ region of the second ultra-high-definition video image. The first video supply terminal and the second video terminal may be a same device or different devices.

In some embodiments, an input unit for inputting an ultra-high-definition video image to FPGA5 is referred to as a primary video processing unit. An input unit for inputting an ultra-high-definition video image to one of FPGA1-4 is referred to as a secondary video processing unit.

The primary video processing unit is coupled to the HDMI interface 1*a* and includes a decoding module 23, such as an HDMI decoder, and two converting modules 23*a* and 23*b* coupled to the decoding module 23.

The decoding module 23 is configured to receive the first ultra-high-definition video image and decode the first ultra-high-definition video image into two channel signals. The converting modules 23*a* and 23*b* are configured to receive the two channel signals, respectively, and convert the two channel signals into two low-voltage differential signals (LVDS), respectively. The two low-voltage differential signals can be used as the two branch primary image signals to be transmitted to the primary processing chip FPGA5.

Each of the secondary video processing units is coupled to one of the HDMI interfaces 1*b*, 1*c*, 1*d*, and 1*f*, and can comprise a decoding module, such as an HDMI decoder, and a first converting module and a second converting module coupled to the decoding module. For example, the secondary video processing unit coupled to the HDMI interface 1*b* can comprise a decoding module 21, such as an HDMI decoder, and a first converting module 21*a* and a second converting module 21*b* coupled to the decoding module 21 The first converting module 21*a* and the second converting module 21*b* are coupled to the second processing chips FPGA3 and FPGA1, respectively. The decoding module 21 is configured to receive a regional image obtained from the second ultra-high-definition video image, and decode the regional image into a first channel signal and a second channel signal. The first converting module 21*a* is configured to receive the first channel signal and convert the first channel signal into a first low-voltage differential signal. The second converting module 21*b* is configured to receive the second channel signal and convert the second channel signal into a second low-voltage differential signal. The first low-voltage differential signal can be transmitted to the secondary processing chip FPGA3, and the second low-voltage differential signal can be transmitted to the secondary processing chip FPGA1.

Similarly, the secondary video processing unit coupled to the HDMI interface 1*c* can comprise a decoding module 22, and two converting modules coupled to the decoding module 22. The two converting modules coupled to the decoding module 22 are coupled to FPGA1 and FPGA3, respectively. The secondary video processing unit coupled to the HDMI interface 1*d* can comprise a decoding module 24, and two converting modules coupled to the decoding module 24. The two converting modules coupled to the decoding module 24 are coupled to FPGA2 and FPGA4, respectively. The secondary video processing unit coupled to the HDMI interface 1*f* can comprise a decoding module 25, and two converting modules coupled to FPGA2 and FPGA4, respectively.

As shown in FIG. 2, FPGA1-4 are coupled to FPGA5. FPGA1 is coupled to FPGA2 and FPGA3. FPGA 2 is further coupled to FPGA4. Since each of FPGA3 and FPGA4 is only coupled to another one FPGA, the coupling between FPGA1 and FPGA3, and the coupling between FPGA2 and FPGA4, are referred to as single couplings.

For each secondary processing chip, a corresponding storage unit, such as DDR 26 illustrated in FIG. 2, can be disposed for caching received low-voltage differential signal (LDVS), and for performing a pixel arrangement to the received image to meet the processing needs of the corresponding secondary processing chip.

Further, the marked connecting lines illustrated in FIG. 2 are described in the following.

Connecting line 1 is a cable between an HDMI decoder and a signal converter, i.e., a converting module. The HDMI decoder can convert the received signal into a left channel signal and a right channel signal, and send the two channel signals to the appropriate signal converters, respectively.

Connecting line 2 is a cable between a signal converter and a corresponding secondary processing chip. The signal converter can convert the signal received from an HDMI decoder into an LDVS signal, and send the LDVS signal to the corresponding processing chip.

Connecting line 3 is a cable between a secondary processing chip and a corresponding storage unit.

Connecting line 4 is a cable between the primary processing chip and a convertor. The primary processing chip can generate a luminance adjustment signal based on the luminance adjustment information transmitted from the secondary processing chips, and send the luminance adjustment signal to the converter via a Serial Peripheral Interface (SPI).

Connecting line 5 is a cable between the primary processing chip and a secondary processing chip. The primary processing chip can send the sub-branch primary image signals to multiple secondary processing chips via the connection lines 5 to be processed by the multiple secondary processing chips.

Connecting line 6 is another cable between the primary processing chip and a secondary processing chip for exchanging information between the primary processing chip and the second processing chip. For example, when the secondary processing chip is ready, the secondary processing chip can send a "ready" signal via the connecting line 6 to the primary processing chip. The primary processing chip can control multiple secondary processing chips simultaneously based on the "ready" signals transmitted from the multiple secondary processing chips.

Connecting line 7 and connecting line 10 are each a cable between two secondary processing chips. The two coupled secondary processing chips can exchange image edge information via the connecting line 7 or the connecting line 10.

Connecting line 8 is a cable between a secondary processing chip and a Timer Control Register (ICON).

Connecting line 9 is a cable between the primary processing chip and a signal on chip (SOC) system. The primary processing chip can receive SOC signals via the connecting line 9.

Connecting line 11 is another cable between the primary processing chip and a secondary processing chip. Luminance adjustment information can be sent from a secondary processing chip to the primary processing chip via a corresponding connecting line 11.

Figure 3:
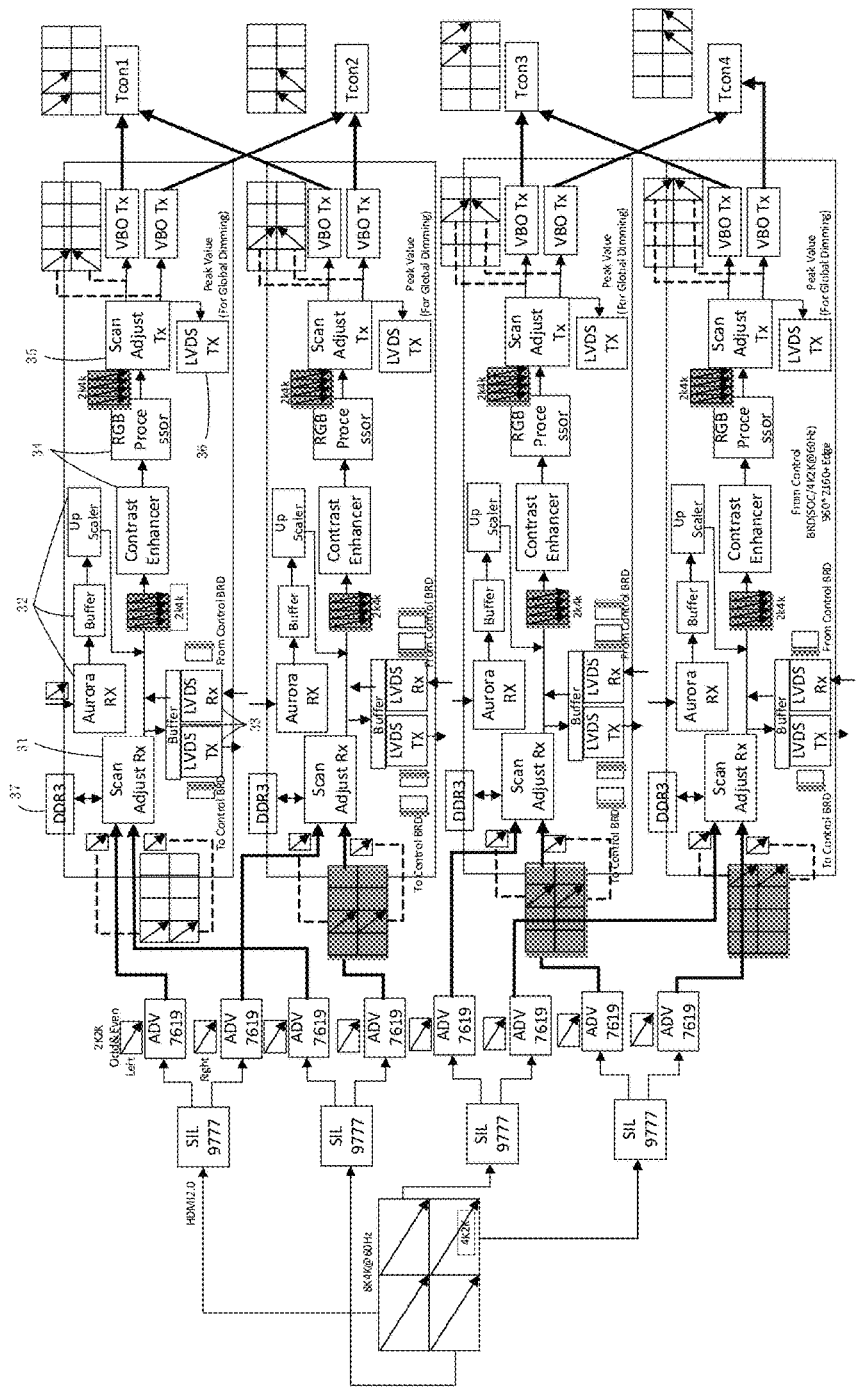
FIG. 3 is a schematic structural diagram of an exemplary secondary processing chip in accordance with some embodiments of the present disclosure.

Referring to FIG. 3, a schematic structural diagram of exemplary secondary processing chips is shown in accordance with some embodiments of the present disclosure. FIG. 3 illustrates four secondary processing chips, such as FPGA1-4 shown in FIG. 2. Hereinafter, FPGA3 is used as an example of the secondary processing chip for describing the structure of and the operating process associated with the secondary processing chip. The structure and operating processes of other secondary processing chips are similar to those of FPGA3.

As illustrated, the FPGA3 can include a first resolution adjustment module 31, a primary information receiving module 37 (also referred to as a "primary information receiver 32"), an image edge information processing module 33, an image processing module 34, a second resolution adjustment module 35, a backlight information processing module 36, and a memory 37.

The first resolution adjustment module 31 is configured to adjust the resolutions of the received two branch regional image signals and adjust them to a group of images.

The primary information receiving module 32 is configured to receive information from the primary processing chip, such as one of the sub-branch primary image signals and edge information associated with the one of the sub-branch primary image signal. The primary information receiving module 32 is also configured to stretch the received sub-branch primary image signal to increase the resolution thereof and adjust them to a group of images.

The image edge information processing module 33 is configured to receive image edge information transmitted from a coupled secondary processing chip, and send self-generated image edge information to a coupled secondary processing chip.

The image processing module 34 is configured to perform an image enhancement process on the group of images from the first resolution adjustment module 31 or the primary information receiving module 32.

The second resolution adjustment module 35 is configured to adjust the resolutions of the enhanced group of images.

The backlight information processing module 36 is configured to send luminance adjustment information to the primary processing chip. The luminance adjustment information can be determined based on the processing results of the second resolution adjustment module 35.

The memory 37 is configured to store the two branch regional image signals received from the corresponding secondary video signal processing units, respectively.

Referring to both FIG. 2 and FIG. 3, when FPGA3 is ready, FPGA3 can start to work in response to receiving a starting signal transmitted from FPGA5. A regional image can be received via an interface HDMI 2.0. Then, the received regional image can be sent to the HDMI decoder 21 corresponding to FPGA3 to be decoded. After the decoding process, the regional image can be divided into left and right channel signals corresponding to the left part and the right part of the regional image, respectively. The two channel signals can be sent to a signal converter corresponding to FPGA1 and a signal converter corresponding to FPGA3, respectively. Meanwhile, another signal converter corresponding to FPGA3 can receive another channel signal from another HDMI decoder, e.g., the HDMI decoder 22.

Referring to FIG. 3, the two branch regional image signals sent to FPGA 3, which are LVDS signals generated by decoding image signals received by HDMI ports and converting the decoded image signals by a signal converter (e.g., ADV 7619 shown in FIG. 3), can be stored in a DDR3 memory 37 corresponding to FPGA3.

For example, as described above, the second ultra-high-definition video image can include an 8K4K image having a resolution of, e.g., 7680×4320, which can be divided according to a crossing segmentation mode into four 4K2K (3840×2160) regional images before being sent to the secondary video processing units (as shown in FIG. 3), i.e., an upper-left regional image, an upper-right regional image, a lower-left regional image, and a lower-right regional image. Each of the four 4K2K regional images is received by one of the secondary video processing units and further divided into two 2K2K (1960×2160) branch regional image signals, i.e., a left and a right branch regional image signals (as shown in FIG. 3). Two left or right branch regional image signals from two left regional images or two right regional images are sent to the same secondary processing chip to be processed (as shown in FIG. 3). That is, the image section signal that a secondary processing chip eventually processes is a 2K4K (1920×4320) image corresponding to a one-fourth region of the second ultra-high-definition video image, where the 2K4K image consists of two vertically arranged 2K2K (1920×2160) branch regional image signals from two regional images.

Figure 5:
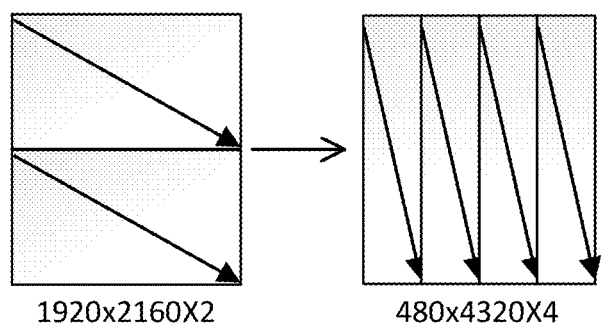
FIG. 5 is a schematic diagram of an exemplary adjustment mode for a first resolution adjustment module of the secondary processing chip at a receiving side in accordance with some embodiments of the present disclosure.

Referring to FIG. 5, a schematic diagram of an exemplary adjustment mode for a first resolution adjustment module of the secondary processing chip at a receiving side is shown in accordance with some embodiments of the present disclosure.

In some embodiments, as described above, FPGA3 can receive two 1920×2160 branch regional image signals that are arranged vertically. After a decoding process, the two decoded branch regional image signals (1920×2160×2) can be adjusted by the first resolution adjustment module (Scan Adjust Rx) 31, in accordance with the adjustment mode shown in FIG. 5, to obtain a group of four 480*4320 images.

Referring again to FIG. 3, in the meantime, the first resolution adjustment module 31 can obtain the image edge information corresponding to FPGA3. Since FPGA3 is coupled to FPGA1, the image edge information can be first cached by a buffer of the image edge information processing module 33, and then be transmitted to FPGA1 via a transmitting sub-module LVDS TX. Further, a receiving sub-module LVDS RX of the image edge information processing module 33 can receive image edge information from FPGA1, and the buffer of the image edge information processing module 33 can cache the image edge information from FPGA1.

Figure 6:
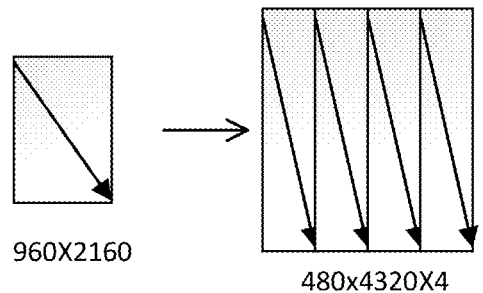
FIG. 6 is a schematic diagram of an exemplary stretching mode for a synchronization signal receiving module of the secondary processing chip in accordance with some embodiments of the present disclosure.

As described above, in some embodiments, the image section signal processed by a secondary processing chip can include a sub-branch primary image signal from the primary processing chip. In this scenario, the sub-branch primary image signal from the primary processing chip can first be stretched and then processed. FIG. 6 shows a schematic diagram of an exemplary stretching mode for a primary information receiving module of the secondary processing chip in accordance with some embodiments of the present disclosure.

Consistent with the present disclosure, a receiving sub-module Aurora RX of the primary information receiving module 32 in FPGA3 can receive the sub-branch primary image signal from the primary processing chip FPGA5. The sub-branch primary image signal is a 960×2160 image obtained by the primary processing chip FPGA5 by processing the received image signal, as described above. Then the sub-branch primary image signal can be cached by a buffer of the primary information receiving module 32, and be stretched into a group of four 480×4320 images, as illustrated in FIG. 6, by a stretch sub-module, Up Scaler, of the primary information receiving module 32.

Referring again to FIG. 3, the received edge image information and the group of four 480×4320 images (from the primary information receiving module or the first resolution adjustment module) can be processed including separation, fusion, and selection. The processing results can be sent to a contrast enhancer sub-module, Contrast Enhancer, and an RGB processing sub-module, RGB Processor, of the image processing module 34 for an image enhancement processing.

Figure 7:
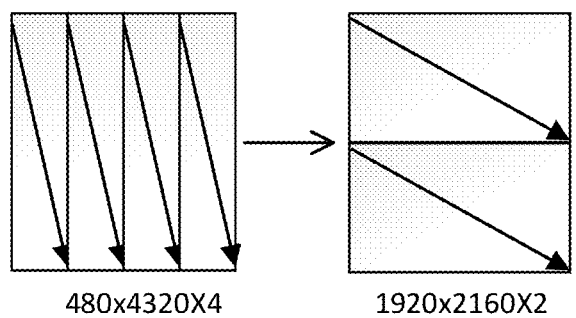
FIG. 7 is a schematic diagram of an exemplary adjustment mode for a second resolution adjustment module of the secondary processing chip at a transmitting side in accordance with some embodiments of the present disclosure.

FIG. 7 shows a schematic diagram of an exemplary adjustment mode for a second resolution adjustment module of the secondary processing chip at a transmitting side in accordance with some embodiments of the present disclosure.

Consistent with the present disclosure, the output signal of the image processing module 34 can be sent to the second resolution adjustment module 35, Scan Adjust Tx, for resolution adjusting in accordance with the adjustment mode shown in FIG. 7. Meanwhile, FPGA3 can send its own luminance information to the primary processing chip, i.e., FPGA5, through the backlight information processing module 36, LVDS TX. Finally, the output image of FPGA3 can be converted into data in a form suitable for the V-By-One standard interface by VBO Tx, and be transmitted to a corresponding TCON.

Figure 4:
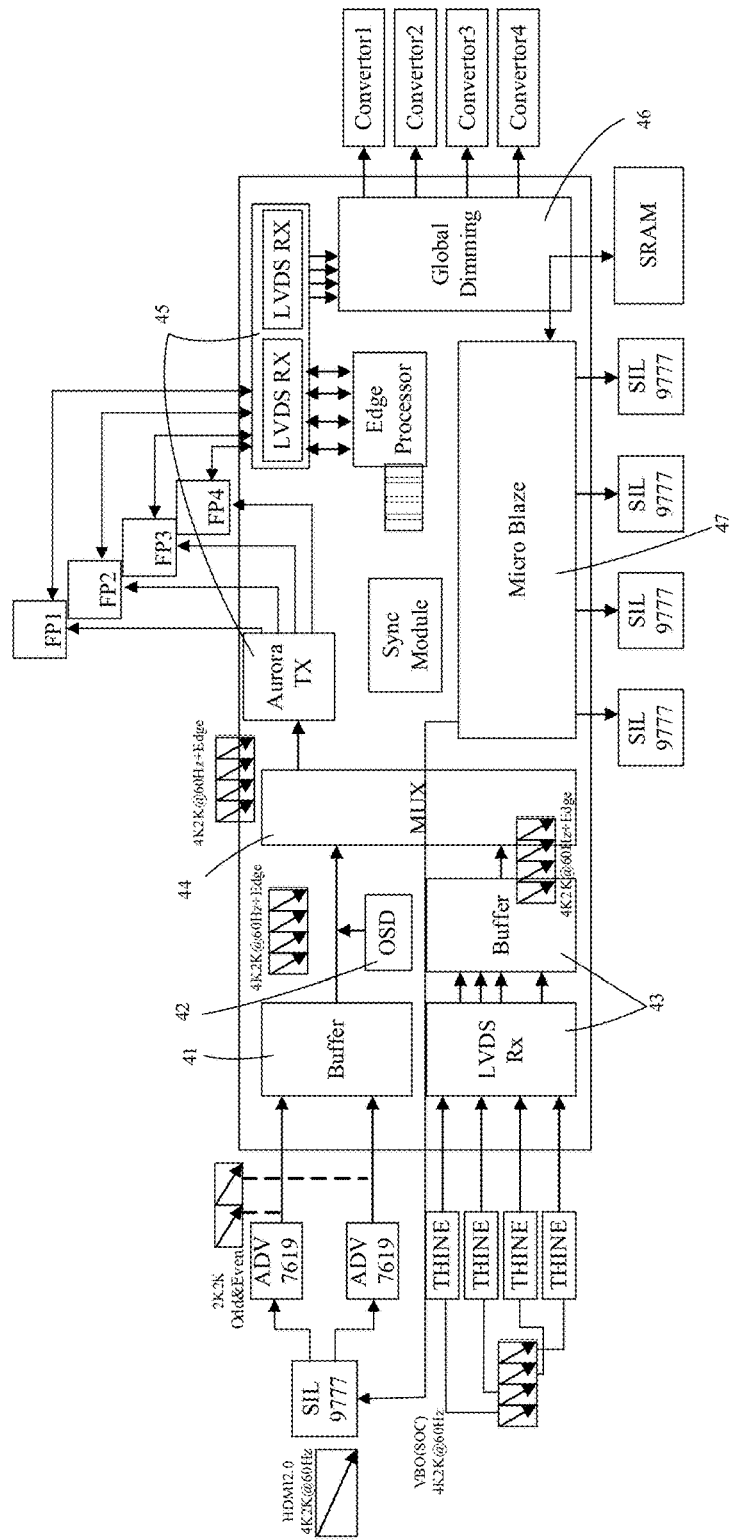
FIG. 4 is a schematic structural diagram of an exemplary primary processing chip in accordance with some embodiments of the present disclosure.

Referring to FIG. 4, a schematic structural diagram of an exemplary primary processing chip is shown in accordance with some embodiments of the present disclosure. The primary processing chip FPGA 5 can include a resolution adjustment module 41, an on-screen display (OSD) module 42, a system on chip (SOC) signal processing module 43, a selection module 44, a communication module 45, a luminance adjustment module 46, and a synchronization processing module 47.

The resolution adjustment module 41 is configured to adjust the resolutions of the received two branch primary image signals.

The OSD module 42 is configured to fuse screen display adjusting information and the two resolution-adjusted branch primary image signals.

The SOC signal processing module 43 is configured to receive and convert an SOC signal.

The selection module 44 is configured to select signals from the fused signals and the converted SOC signal as the sub-branch primary image signals.

The communication module 45 is configured to, for example, transmit the sub-branch primary image signals and edge information to the secondary processing chips and to receive luminance adjustment information from the secondary processing chips.

The luminance adjustment module 46 is configured to generate the luminance adjustment signal based on the luminance adjustment information sent from the secondary processing chips.

The synchronization processing module 47 is configured to control the synchronization of the secondary processing chips.

Referring to both FIG. 2 and FIG. 4, when the primary processing chip FPGA5 starts to work, a first image signal can be received via an HDMI 2.0 interface. The first image signal can be decoded by the HDMI decoder and be divided into two channel signals. The two channel signals can be sent to the two signal converters corresponding to the FPGA5, respectively, and be converted into LVDS signals by the two signal converters, which are input into FPGA5 as the two branch primary image signals.

Figure 8:
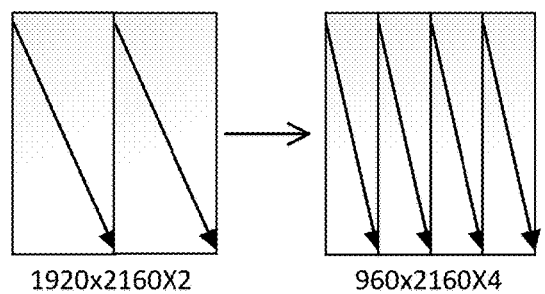
FIG. 8 is a schematic diagram of a schematic diagram of an exemplary adjustment mode for a resolution adjustment module of the primary processing chip in accordance with some embodiments of the present disclosure.

FIG. 8 shows a schematic diagram of an exemplary adjustment mode for a resolution adjustment module of the primary processing chip in accordance with some embodiments of the present disclosure.

The two channel signals (1920×2160×2) can be cached in the buffer of the resolution adjustment module 41, and can be converted into a group of four 960×2160 images in accordance with the converting mode shown in FIG. 8. Next, the output signal of the resolution adjustment module 41 and the screen display adjusting information of the on-screen display (OSD) module 42 can be fused. Accordingly, a functional menu displayed on the screen can be used for adjusting various parameters.

Referring again to FIG. 4, in addition to receiving the signals described above, the primary processing chip can also receive the SOC signal, which can also be a 4K2K (3840×2160) signal, from the system on-chip signal processing module 43 to ensure a good sound effect of a TV signal. The SOC signal can also be divided into a group of 960×2160 images.

The received SOC signal can be cached by a corresponding buffer, and then can be sent together with the fused signal into the selection module MUX 44. The selection module MUX 44 can select the fused signal or the SOC signal as the sub-branch primary image signals, which can then be transmitted to the four secondary processing chips via a transmission sub-module Aurora TX of the communication module 45.

Further, the luminance adjustment module Global Dimming 46 can receive luminance adjustment information from the secondary processing chips via a receiving sub-module LVDS RX of the communication module 45. Based on the luminance adjustment information from the secondary processing chips, the luminance adjustment module Global Dimming 46 can generate a luminance adjustment signal.

In order to ensure the synchronization of all secondary processing chips, the synchronization processing module 47 of the primary processing chip can control the synchronization of the secondary processing chips.

Figure 9A:
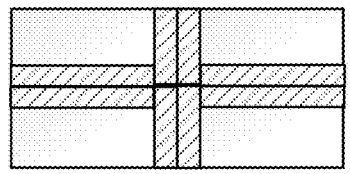
FIGS. 9A and 9B are schematic diagrams of an existing image segmentation mode and an existing image scanning mode, respectively.
Figure 9B:
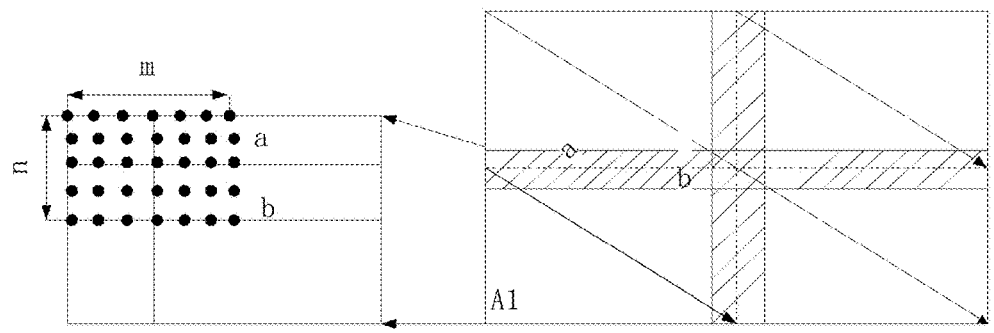

FIGS. 9A and 9B show a schematic diagram of an existing image segmentation mode and a schematic diagram of an existing image scanning mode, respectively.

The existing image segmentation mode can be a crossing segmentation mode as illustrated in FIG. 9A. Taking the left lower image region A1 shown in FIG. 9B as an example, due to the existence of a filter kernel, to calculate the pixel value of the central pixel of the rectangular filter kernel, pixel values of the entire rectangular area are needed. In order to calculate the pixel values of region b, the pixel values of the shaded area of region a are needed.

In accordance with the existing scanning mode as shown in FIG. 9B, the scanning process needs to be completed for the upper left region to obtain corresponding scanning results, which are required in the scanning process of the lower left region. As such, data of one frame is required to be cached, resulting in a data delay.

Figure 10A:
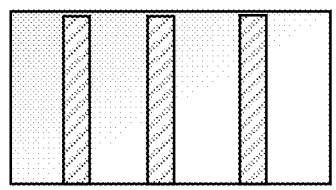
FIGS. 10A and 10B are schematic diagrams of an exemplary image segmentation mode and an exemplary image scanning mode in accordance with some embodiments of the present disclosure, respectively.
Figure 10B:
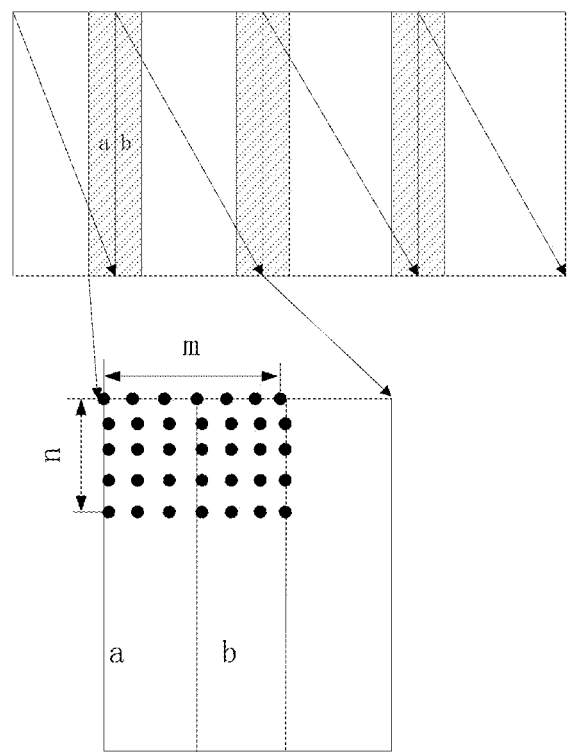

FIG. 10A and FIG. 10B show a schematic diagram of an exemplary image segmentation mode and an exemplary image scanning mode in accordance with some embodiments of the present disclosure, respectively.

According to the present disclosure, a received 8K4K signal (the second ultra-high-definition video image) is eventually segmented in a "III" segmentation mode into four image section signals, as illustrated in FIG. 10A, and then be processed by the secondary processing chips. When a secondary processing chip processes the image section signal, which, as described above, consists of two branch regional image signals from two secondary video processing units, the secondary processing chip stores pixel values of a corresponding row based on the size of the filter kernel size, and receive the image edge information from a coupled secondary processing chip. Upon receiving data of several rows, algorithm data can be read from the corresponding buffer to perform the algorithm calculation, and the calculation results can be cached and output. Consistent with the present disclosure, since the image section signals processed by different secondary processing chips have connecting edges along a vertical direction, only the pixels of one or two rows need to be cached.

Accordingly, in some disclosed embodiments, each secondary processing chip only needs to process ¼ region of the 8K4K signal. Therefore, two secondary processing chips that are coupled to each other only need to exchange the information of the vertical boundary edge between the corresponding regional images. Compared with the existing processing method, the disclosed display process method can have a higher processing efficiency.

Based on the above description, in the disclosed embodiments, the primary processing chip can process the image signal corresponding to the first ultra-high-definition video image, each of the four the secondary processing chips can process a image section signal corresponding to one fourth of the second ultra-high-definition video image. The primary processing chip can control the synchronization of the secondary processing chips. Since each of the four secondary processing chips only needs to process an image section signal corresponding to one fourth of the second ultra-high-definition video image, the secondary processing chips can be chosen from processing chips that have a middle to low data processing capability and also have a relatively low price. Therefore, according to the present disclosure, ultra-high-definition video image processing can be realized without requiring chips with a high data processing capability, and the production costs can be reduced as compared to the existing display processing apparatus.

Figure 11:
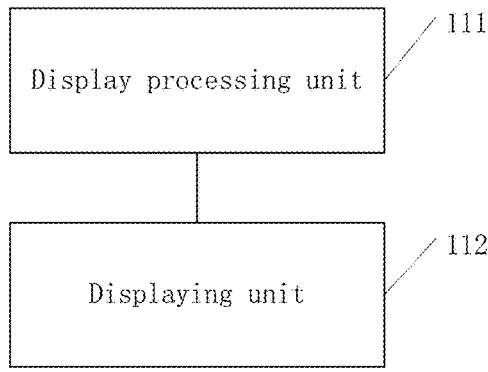
FIG. 11 is a schematic diagram of an exemplary display processing device in accordance with some embodiments of the present disclosure.

FIG. 11 shows a schematic diagram of an exemplary display processing device in accordance with some embodiments of the present disclosure.

As illustrated, the display processing device can comprise a display processing unit 111 including a display processing apparatus consistent with the present disclosure, such as one of the above-described exemplary display processing apparatuses, and a displaying unit 112 configured to receive and display the output image of the display processing unit 111

According to the present disclosure, ultra-high-definition video image processing can be realized without requiring chips with a high data processing capability, and the production costs can be reduced as compared to the existing display processing apparatus.

Figure 12A:
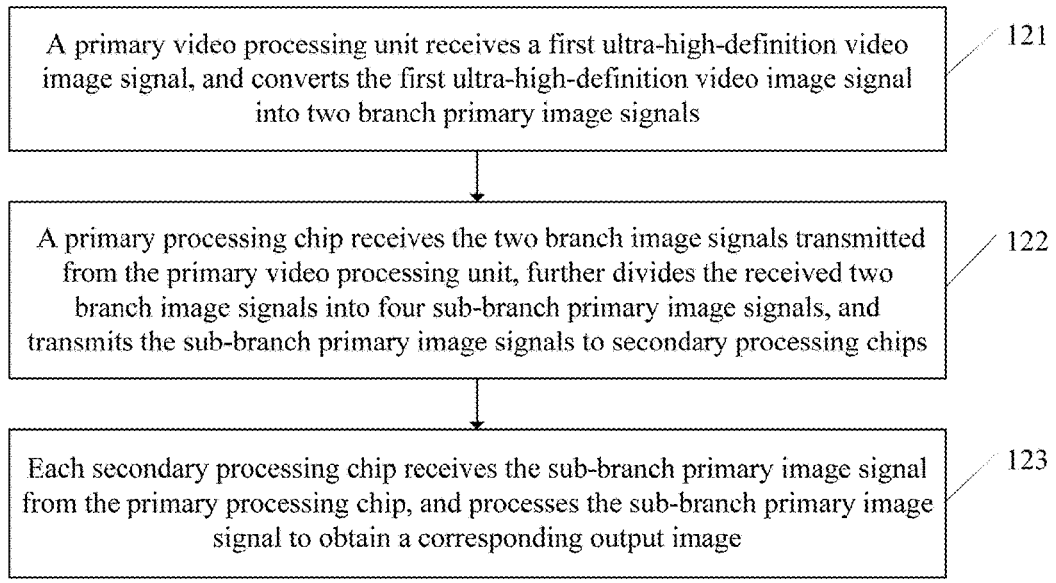
FIGS. 12A and 12B are schematic flowcharts of exemplary display processing methods in accordance with some embodiments of the present disclosure.
Figure 12B:
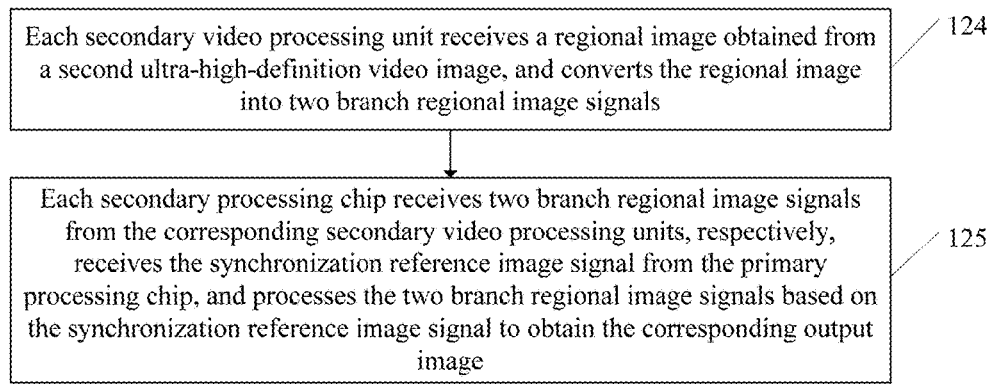

Referring to FIGS. 12A and 12B, schematic flowcharts of exemplary display processing methods are shown in accordance with some embodiments of the present disclosure.

As shown in FIG. 12A, at 121, a primary video processing unit receives a first ultra-high-definition video image, and converts the first ultra-high-definition video image into two branch primary image signals.

In some embodiments, the first ultra-high-definition video image may be a 4K2K@60 Hz (3840×2160) video image signal.

At 122, a primary processing chip receives the two branch primary image signals transmitted from the primary video processing unit, further divides the received two branch primary image signals into four sub-branch primary image signals, and transmit the sub-branch primary image signals to multiple secondary processing chips.

In some embodiments, process 122 can include the following sub-processes.

At 1221, a resolution adjustment module adjusts the resolutions of the received two branch primary image signals.

At 1222, an on-screen display (OSD) module fuses screen display adjusting information and the two branch primary image signal after the resolution adjustment.

At 1223, a system on chip (SOC) signal processing module receives and converts an SOC signal.

At 1224, a selection module selects the sub-branch primary image signals from the fused signal and the converted SOC signal.

At 1225. a communication module transmits the sub-branch primary image signals to the multiple secondary processing chips.

At 1226, a luminance adjustment module generates a luminance adjustment signal based on luminance adjustment information sent from the multiple secondary processing chips.

At 1227, a synchronization processing module controls a synchronization of the multiple secondary processing chips.

Referring again to FIG. 12, at 123, each secondary processing chip receives the sub-branch primary image signal from the primary processing chip, and processes the sub-branch primary image signal to obtain a corresponding output image.

In some embodiments, process 123 can include the following sub-processes.

At 1231, a primary information receiving module stretches the sub-branch primary image signal.

At 1232, an image processing module performs an image enhancement processing on the stretched sub-branch primary image signal.

In some embodiments, in order to further improve the image quality, the process 123 can further include the following sub-process. At 1233, the primary information receiving module further receives image edge information transmitted from the primary processing chip. In these embodiments, at 1232, the image processing module can use the received image edge information to perform the image enhancement processing on the stretched sub-branch primary image signal.

As shown in FIG. 12B, at 124, each of the multiple secondary video processing units receives a regional image obtained from a second ultra-high-definition video image, and converts the regional image into two branch regional image signals. In some embodiments, the second ultra-high-definition video image may be an 8K4K@60 Hz (7680× 4320) video image signal. The regional image may correspond to a ¼ region of the second ultra-high-definition video image.

At 125, each secondary processing chip receives two branch regional image signals from the corresponding secondary video processing units, respectively, receives the synchronization reference image signal from the primary processing chip, and processes the two branch regional image signals based on the synchronization reference image signal to obtain the corresponding output image.

When each secondary video processing unit has received the two branch regional image signals from the corresponding secondary video processing units, respectively, the two branch regional image signals can be stored for facilitating the processing.

In some embodiments, process 125 can include the following sub-processes.

At 1251, a first resolution adjustment module adjusts resolutions of the received two branch regional image signals.

At 1252, an image processing module performs an image enhancement processing on the resolution-adjusted image signals.

In some embodiments, in order to further improve the image quality, the process 125 can further include the following sub-process. At 1253, an image edge information processing module receives image edge information transmitted from a coupled secondary processing chip, and sends self-generated image edge information to a coupled secondary processing chip. In these embodiments, at 1252, the image processing module can use the received image edge information to perform the image enhancement processing on the resolution-adjusted image signals.

Based on the above description, in the disclosed embodiments, the primary processing chip can process the image signal corresponding to the first ultra-high-definition video image, each of the four the secondary processing chips can process an image section signal corresponding to one fourth of the second ultra-high-definition video image. The primary processing chip can control the synchronization of the secondary processing chips. Since each of the four secondary processing chips only needs to process an image section signal corresponding to one fourth of the second ultra-high-definition video image, the secondary processing chips can be chosen from processing chips that have a middle to low data processing capability and also have a relatively low price. Therefore, according to the present disclosure, ultra-high-definition video image processing can be realized without requiring chips with a high data processing capability, and the production costs can be reduced as compared to the existing display processing apparatus.

Figure 13A:
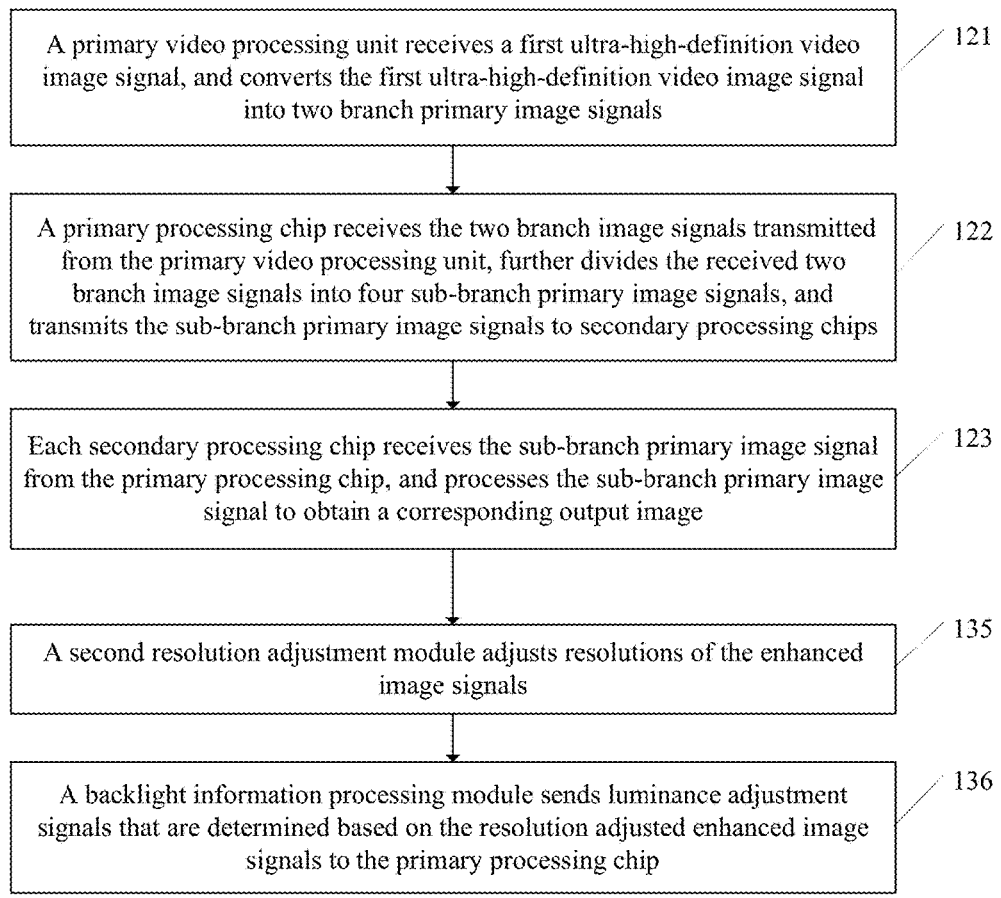
FIGS. 13A and 13B are schematic flowcharts of other exemplary display processing methods in accordance with some other embodiments of the present disclosure.
Figure 13B:
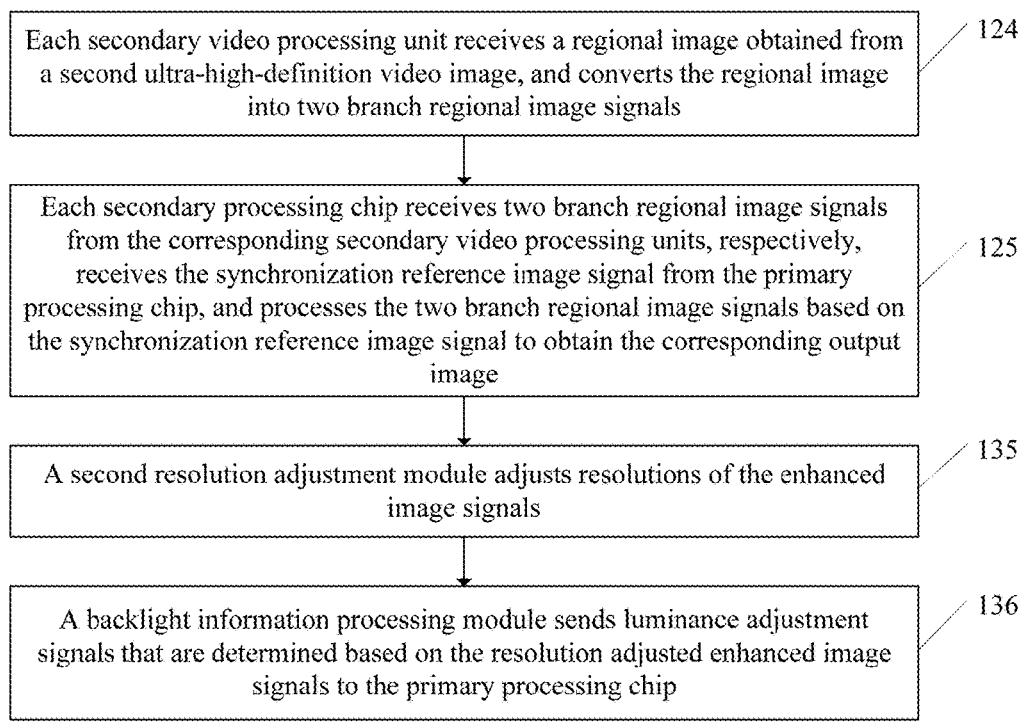

FIGS. 13A and 13B show schematic flowcharts of exemplary display processing methods in accordance with some other embodiments of the present disclosure. The exemplary display processing methods shown in FIGS. 13A and 13B are similar to the exemplary display processing methods shown in FIGS. 12A and 12B, respectively, except that the exemplary display processing methods shown in FIGS. 13A and 13B each further include the following processes to ensure that the output signal satisfies the requirements of a television display.

At 135, a second resolution adjustment module adjusts the resolutions of the enhanced image signals.

At 136, a backlight information processing module sends luminance adjustment information to the primary processing chip. The luminance adjustment information can be determined based on the resolution adjusted enhanced image signals.

Based on the above description, in the disclosed embodiments, the primary processing chip can divide the image signal corresponding to the first ultra-high-definition video image into four sub-branch primary image signals and send to the secondary processing chips. Each of the four the secondary processing chips can process one of the four sub-branch primary image signals or an image section signal corresponding to one fourth of the second ultra-high-definition video image. The primary processing chip can control the synchronization of the secondary processing chips, Since each of the four secondary processing chips only needs to process an image section signal corresponding to one fourth of the second ultra-high-definition video image, the secondary processing chips can be chosen from processing chips that have a middle to low data processing capability and also have a relatively low price. Therefore, according to the present disclosure, ultra-high-definition video image processing can be realized without requiring chips with a high data processing capability, and the production costs can be reduced as compared to the existing display processing apparatus. Further, since the output image is further adjusted according to the display requirements, the output image better satisfies the display requirements.

In the above embodiments, four secondary processing chips and correspondingly four secondary video processing units are described as examples. The present disclosure, however, is not limited to the exact number of secondary processing chips and the exact number of secondary video processing units. A display processing apparatus or a display processing device consistent with the present disclosure can include more or less than four secondary processing chips and, correspondingly, more or less than four secondary video processing units. Further, a display processing apparatus or a display processing device consistent with the present disclosure also may not include the secondary video processing units, i.e., the image signals to be processed by the secondary processing chips can be input to the secondary processing chips directly without being first processed by the secondary video processing units. Similarly, a display processing apparatus or a display processing device consistent with the present disclosure also may not include the primary video processing unit, i.e., the image signal to be processed by the primary processing chip can be input to the primary processing chip directly without being first processed by the primary video processing unit.

Figure 14A:
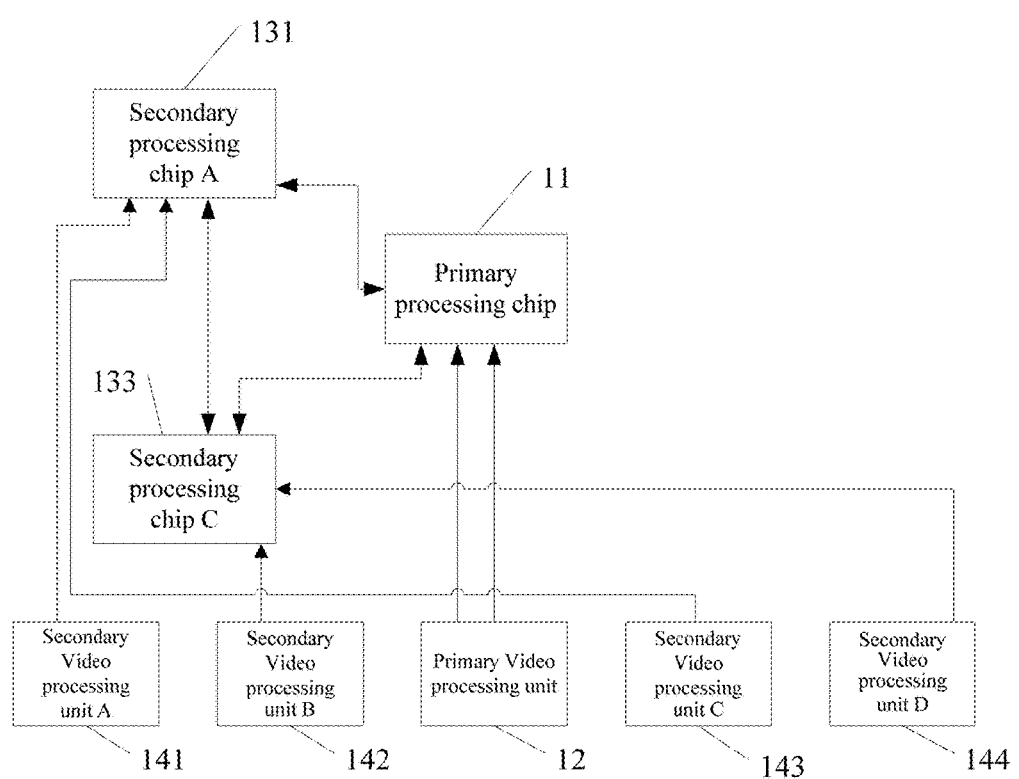
FIGS. 14A and 14B are schematic diagrams of exemplary display processing apparatuses in accordance with some other embodiments of the present disclosure.
Figure 14B:
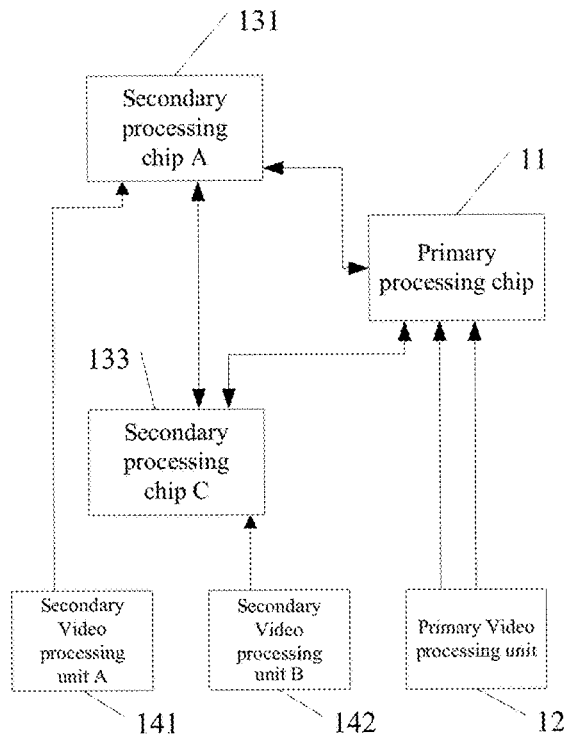

FIGS. 14A and 14B show schematic diagrams of other exemplary display processing apparatuses consistent with the present disclosure. The display processing apparatuses shown in FIGS. 14A and 14B are similar to the display processing apparatus shown in FIG. 1, except that the display processing apparatus in FIG. 14A includes only two secondary processing chips—the secondary processing chip A 131 and the secondary processing chip C 133, and the four secondary video processing units, and that the display processing apparatus in FIG. 14B includes the two secondary processing chips and two corresponding secondary video processing units—the secondary video processing unit A 141 and the second video processing unit B 142. The number of secondary video processing units can depend on the processing capability of the secondary video processing units and the resolution of the second ultra-high-definition video image. For example, if the secondary video processing units include HDMI decoders, then four secondary video processing units may be needed if the second ultra-high-definition video image includes an 8K4K@60 Hz video image signal (as shown in FIG. 14A) or two secondary video processing units may be needed if the second ultra-high-definition video image includes a 4K2K@60 Hz video image signal (as shown in FIG. 14B).

In the example shown in FIG. 14A, the second ultra-high-definition video image is divided into four regional images and input into the four secondary video processing units, respectively. The output of the secondary video processing unit A 141 and the output of the secondary video processing unit C 143 are input into the secondary processing chip A 131 to be processed. Similarly, the output of the secondary video processing unit B 142 and the secondary video processing unit D 144 are input into the secondary processing chip C 133 to be processed. In the example shown in FIG. 14B, the second ultra-high-definition video image is divided into two regional images and input into the two secondary video processing units, respectively. The outputs of the two secondary video processing units are input into the two secondary processing chips to be processed, respectively.

Figure 15:
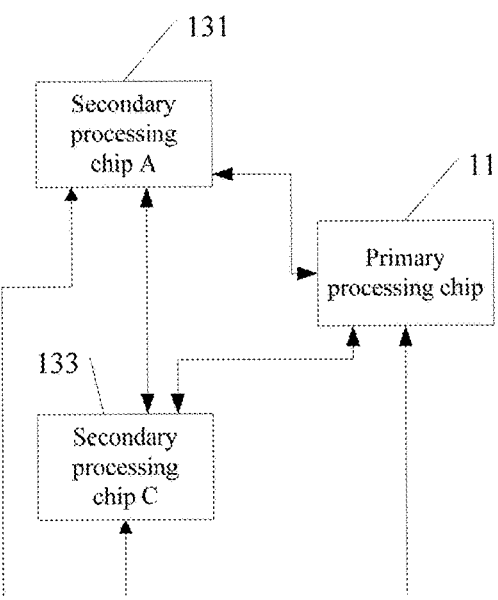
FIG. 15 is a schematic diagram of another exemplary display processing apparatus in accordance with some other embodiments of the present disclosure.

FIG. 15 shows a schematic diagram of another exemplary display processing apparatus consistent with the present disclosure. The display processing apparatus shown in FIG. 15 is similar to the display processing apparatus shown in FIG. 14A or 14B, except that the display processing apparatus shown in FIG. 15 does not include the primary video processing unit and the secondary video processing units. That is, in this embodiment, the first ultra-high-definition video image is input into the first processing chip directly for processing, e.g., dividing into image section signals. Similarly, the second ultra-high-definition video image is divided into image section signals and input into the secondary processing chips directly for processing. The display processing apparatus shown in FIG. 15 includes two secondary processing chips, i.e., the secondary processing chip A 131 and the secondary processing chip C 133. However, consistent with the present disclosure, the display processing apparatus can include more than two secondary processing chips, such as three or four, or even more, secondary processing chips. In these embodiments, since no secondary video processing unit is used, the second ultra-high-definition video image can be divided according to a vertical segmentation mode directly, i.e., the second ultra-high-definition video image can be divided into several sections, i.e., the image section signals, where each two neighboring sections are separated from each other by a vertical edge.

The processes conducted in the display processing apparatus of FIG. 14A, 14B, or 15 is similar to that in the display processing apparatus of FIG. 1, and thus details thereof are omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a display processing apparatus, a related display processing device, and a related display processing method are provided.

Although the disclosure has been described and illustrated in the foregoing illustrative embodiments, it is understood that the present disclosure has been made only by way of example, and that numerous changes in the details of embodiment of the disclosure can be made without departing from the spirit and scope of the present disclosure. Features of the disclosed embodiments can be combined and rearranged in various ways. Without departing from the spirit and scope of the present disclosure, modifications, equivalents, or improvements to the disclosed embodiments are understandable to those skilled in the art and are intended to be encompassed within the scope of the present disclosure.

What is claimed is:

1. A display processing apparatus, comprising:
a primary processing chip configured to receive a first ultra-high-definition video image and generate two or more sub-branch primary image signals; and
two or more secondary processing chips coupled to the primary processing chip and coupled to each other, each of the secondary processing chips being configured to:
receive and process one of the sub-branch primary image signals to generate a first output image signal,
receive and process an image section signal obtained from a second ultra-high-definition video image to generate a second output image signal.

2. The display processing apparatus of claim 1, wherein:
the first ultra-high-definition video image has a lower resolution than the second ultra-high-definition video image,
the sub-branch primary image signals correspond to first regions of the first ultra-high-definition video image, each boundary between neighboring first regions being along a same direction in the first ultra-high-definition video image, and
the image section signals correspond to second regions of the second ultra-high-definition video image, each boundary between neighboring second regions being along a same direction in the second ultra-high-definition video image.

3. The display processing apparatus of claim 2, wherein:
the first ultra-high-definition video image includes a 4K2K@60 Hz video image signal;
the second ultra-high-definition video image includes an 8K4K@60 Hz video image signal; and each of the primary processing chip and the secondary processing chips includes a field-programmable gate array chip.

4. The display processing apparatus of claim 1, further comprising:
a primary video processing unit coupled to the primary processing chip and configured to receive the first ultra-high-definition video image, and convert the first ultra-high-definition video image into two branch primary image signals,
wherein the primary processing chip is further configured to receive the branch primary image signals transmitted from the primary video processing unit, and divide the branch primary image signals into the sub-branch primary image signals.

5. The display processing apparatus of claim 4, wherein the primary video processing unit comprises:
a decoder configured to receive the first ultra-high-definition video image, and decode the first ultra-high-definition video image into two channel signals; and
two converters configured to receive the two channel signals, respectively, and convert the two channel signals into two low-voltage differential signals as the two branch primary image signals, respectively.

6. The display processing apparatus of claim 4, wherein the primary processing chip comprises:
a resolution adjuster configured to adjust resolutions of the received two branch primary image signals to generate two resolution-adjusted branch primary image signal;
an on-screen display fuser configured to fuse screen display adjusting information and the two resolution-adjusted branch primary image signals;
a system on chip (SOC) signal processor configured to receive and convert an SOC signal;
a selector configured to select the fused signals or the converted SOC signal as the sub-branch primary image signals;
a transmitter configured to transmit the sub-branch primary image signals to the secondary processing chips;
a luminance adjuster configured to generate luminance adjustment signals based on luminance adjustment information sent from the secondary processing chips; and
a synchronization processor configured to control synchronization of the secondary processing chips.

7. The display processing apparatus of claim 1, further comprising:
two or more secondary video processing units each configured to receive a regional image obtained from the second ultra-high-definition video image, and convert the regional image into one or more branch regional image signals, the regional image including a fraction of the second ultra-high-definition video image,
wherein each of the secondary processing chips is further configured to receive one of the one or more branch regional image signals transmitted from each of at least one secondary video processing unit coupled to the secondary processing chip, the received one or more branch regional image signals forming the image section signal.

8. The display processing apparatus of claim 7, wherein:
each of the secondary processing chips is further configured to receive image edge information transmitted from a coupled secondary processing chip, and generate the output image signal based on a combination of the received image edge information and the received one or more branch regional image signals.

9. The display processing apparatus of claim 8, wherein each of the secondary processing chips comprises:
a resolution adjuster configured to adjust resolutions of the received one or more branch regional image signals to generate one or more resolution-adjusted branch regional image signals;
a synchronization signal receiver configured to receive a synchronization reference image signal from the primary processing chip;
an image edge information processor configured to receive the image edge information transmitted from the coupled secondary processing chip, and send self-generated image edge information to the coupled secondary processing chip; and
an image processor configured to use the synchronization reference image signal and the received image edge information to perform an image enhancement processing on the two resolution-adjusted branch regional image signals to generate two enhanced branch regional image signals.

10. The display processing apparatus of claim 9, wherein:
the resolution adjuster is a first resolution adjuster, and each of the secondary processing chips further includes:
a second resolution adjuster configured to adjust resolutions of the two enhanced branch regional image signals; and
a backlight information processor configured to send luminance adjustment information to the primary processing chip, the luminance adjustment information being determined based on an output of the second resolution adjuster.

11. The display processing apparatus of claim 7, wherein each of the secondary video processing units comprises:
a decoder configured to receive the second ultra-high-definition video image, and decode the second ultra-high-definition video image into a first channel signal and a second channel signal;
a first converter configured to receive the first channel signal, convert the first channel signal into a first low-voltage differential signal, and send the first low-voltage differential signal to one of the secondary processing chips coupled to the secondary video input unit as one branch regional image signal; and
a second converter configured to receive the second channel signal, convert the second channel signal into a second low-voltage differential signal, and send the second low-voltage differential signal to another one of the secondary processing chips coupled to the secondary video input unit as another branch regional image signal.

12. A display processing method, comprising:
receiving, by each of a plurality of processing chips, an image section signal obtained from an ultra-high-definition video image;
processing, by the each of the processing chips, the image section signal to generate an output image signal;
receiving, by the each of the processing chips, image edge information transmitted from a coupled processing chip; and
generating, by the each of the processing chips, the corresponding output image signal based on a combination of the received image edge information and the image section signal,
wherein the image section signals correspond to regions of the ultra-high-definition video image, each boundary between neighboring regions being along a same direction in the ultra-high-definition video image.

13. The display processing method of claim 12, wherein: the ultra-high-definition video image includes an 8K4K@60 Hz video image signal; and each of the processing chips includes a field-programmable gate array chip.

14. The display processing method of claim 12, further comprising:
receiving, by each of at least two video processing units, a regional image obtained from the ultra-high-definition video image; and
converting, by the each of the video processing units, the regional image into two branch regional image signals, wherein receiving, by the each of the processing chips, the image section signal includes receiving, by the each of the processing chips, two branch regional image signals transmitted from two of the video processing units coupled to the processing chip.

15. The display processing method of claim 14, further comprising:
adjusting, by a first resolution adjuster of the processing chip, resolutions of the received two branch regional image signals to generate two resolution-adjusted branch regional image signals;
receiving, by a synchronization signal receiver of the processing chip, a synchronization reference image signal;
receiving, by an image edge information processor of the processing chip, the image edge information transmitted from a coupled processing chip;
sending, by the image edge information processor of the processing chip, self-generated image edge information to the coupled processing chip;
performing, by an image processor of the processing chip, an image enhancement processing on the two resolution-adjusted branch regional image signals using the synchronization reference image signal and the received image edge information to generate two enhanced branch regional image signals;
adjusting, by a second resolution adjuster of the processing chip, resolutions of the two enhanced branch regional image signals; and
outputting, by a backlight information processor of the processing chip, luminance adjustment information, the luminance adjustment information being determined based on an output of the second resolution adjuster.

16. A display processing method, comprising:
receiving, by a video processing unit, an ultra-high-definition video image;
converting, by the video processing unit, the ultra-high-definition video image into two branch primary image signals;
receiving, by a primary processing chip, the branch primary image signals from the video processing unit;
dividing, by the primary processing chip, the branch primary image signals into two or more sub-branch primary image signals;
transmitting, by the primary processing chip, the two or more sub-branch primary image signals to two or more secondary processing chips; and
processing, by each of the secondary processing chips, the received sub-branch primary image signal to generate an output image signal.

17. The display processing method of claim 16, wherein:
the ultra-high-definition video image includes a 4K2K@60 Hz video image signal; and
each of the primary processing chip and the secondary processing chips includes a field-programmable gate array chip.

18. The display processing method of claim 16, further comprising:
adjusting, by a resolution adjuster of the primary processing chip, resolutions of the received two branch primary image signals to generate two resolution-adjusted branch primary image signals;
fusing, by an on-screen display fuser of the primary processing chip, screen display adjusting information and the two resolution-adjusted branch primary image signals;
receiving and converting, by a system on chip (SOC) signal processor of the primary processing chip, an SOC signal;
selecting, by a selector of the primary processing chip, the fused signals or the converted SOC signal as the sub-branch primary image signals;
transmitting, by a transmitter of the primary processing chip, the sub-branch primary image signals to the secondary processing chips;
generating, by a luminance adjuster of the primary processing chip, luminance adjustment signals based on luminance adjustment information sent from the secondary processing chips; and
controlling, by a synchronization processor of the primary processing chip, synchronization of the secondary processing chips.

* * * * *